US010812444B2

(12) United States Patent
Humm

(10) Patent No.: US 10,812,444 B2
(45) Date of Patent: Oct. 20, 2020

(54) NETWORK CONFIGURATION AND METHOD FOR ASSIGNING OF NETWORK ADDRESSES TO FANS IN A NETWORK

(71) Applicant: ebm-papst Mulfingen Gmbh & Co. KG, Mulfingen (DE)

(72) Inventor: Markus Humm, Weissbach (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 51 days.

(21) Appl. No.: 15/232,848

(22) Filed: Aug. 10, 2016

(65) Prior Publication Data
US 2017/0048189 A1    Feb. 16, 2017

(30) Foreign Application Priority Data

Aug. 14, 2015  (DE) ........................ 10 2015 113 489

(51) Int. Cl.
| | | |
|---|---|---|
| *H04L 29/12* | (2006.01) |
| *G06F 21/32* | (2013.01) |
| *H04W 4/80* | (2018.01) |
| *H04L 12/40* | (2006.01) |
| *G06K 7/10* | (2006.01) |

(52) U.S. Cl.
CPC .......... *H04L 61/20* (2013.01); *G06K 7/10366* (2013.01); *H04L 12/40045* (2013.01); *H04L 61/2038* (2013.01); *H04W 4/80* (2018.02); *G05B 2219/21028* (2013.01); *G06F 21/32* (2013.01)

(58) Field of Classification Search
CPC ...... G06F 21/35; G06F 3/0346; H04W 4/043; H05B 37/0272
See application file for complete search history.

(56) References Cited

U.S. PATENT DOCUMENTS

| | | | | |
|---|---|---|---|---|
| 2012/0190386 A1* | 7/2012 | Anderson | ............. | G01C 15/04 455/456.3 |
| 2012/0306621 A1* | 12/2012 | Muthu | ............... | H05B 37/0272 340/8.1 |
| 2013/0247117 A1* | 9/2013 | Yamada | ................. | G08C 17/02 725/93 |
| 2014/0183269 A1* | 7/2014 | Glaser | ..................... | G06F 21/32 235/492 |

(Continued)

FOREIGN PATENT DOCUMENTS

| | | |
|---|---|---|
| DE | 102 40 832 A1 | 3/2004 |
| DE | 10 2004 039 447 A1 | 12/2005 |

(Continued)

*Primary Examiner* — Barbara B Anyan
(74) *Attorney, Agent, or Firm* — Harness, Dickey & Pierce, P.L.C.

(57) ABSTRACT

The present invention concerns a method for the configuration of a network with network addresses, wherein the network consists of at least one central computer and a plurality of fans, which can communicate via a bus system in wired and/or wireless manner with the central computer, wherein each fan has a rewritable memory and a RFID interface for communication with a preferably mobile communications device, wherein the serial number of the respective fan is saved in its memory and the serial number can be read out by the communications device in the nonoperational voltage-free state of the particular fan.

13 Claims, 1 Drawing Sheet

(56) References Cited

U.S. PATENT DOCUMENTS

2015/0327010 A1* 11/2015 Gottschalk .............. G06F 17/50
455/456.1
2017/0026779 A1* 1/2017 Schmidlin ............... H04W 4/70

FOREIGN PATENT DOCUMENTS

| EP | 0485878 | A2 | 5/1992 |
| EP | 2503763 | A1 | 9/2012 |

* cited by examiner

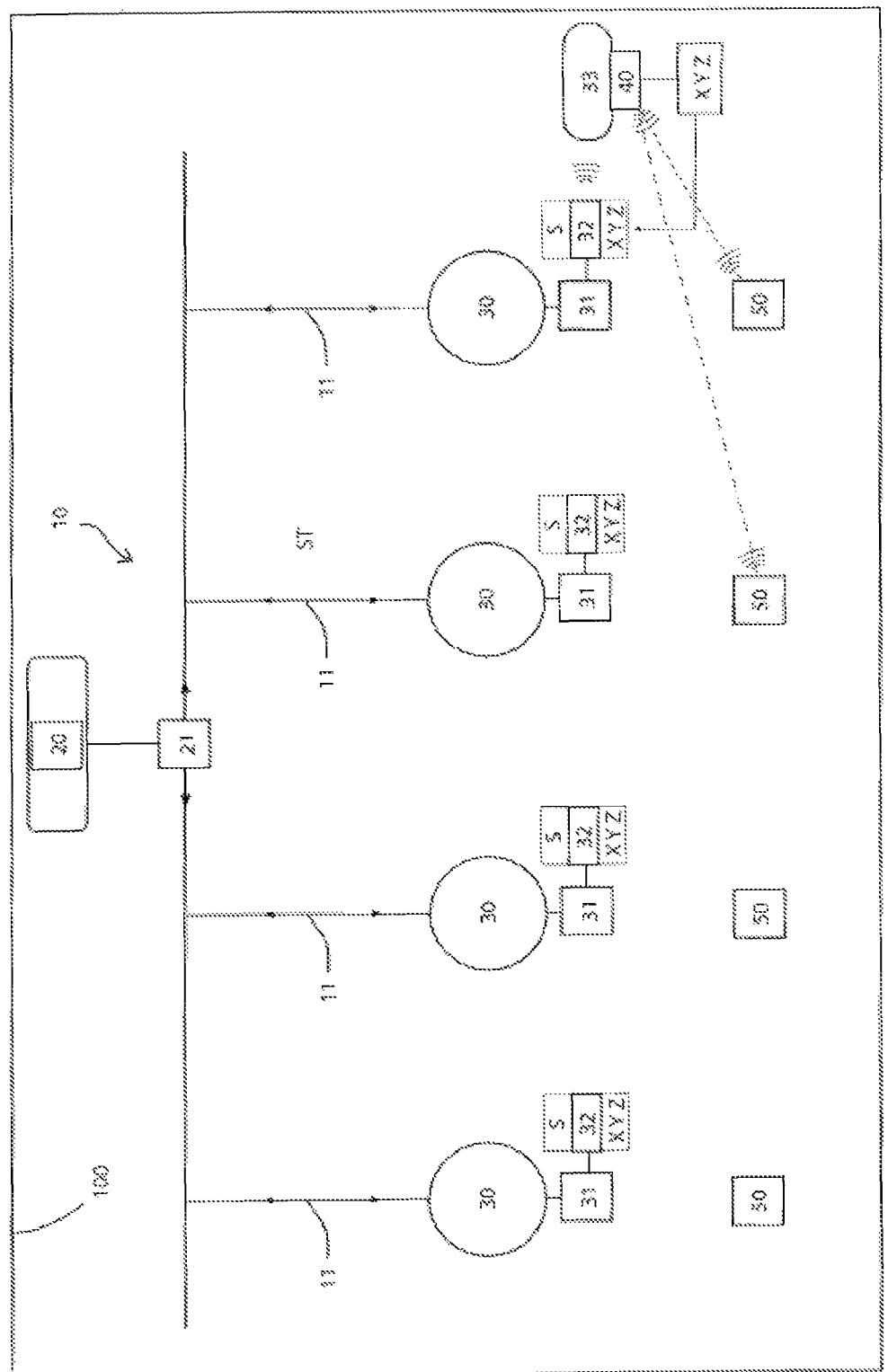

NETWORK CONFIGURATION AND METHOD FOR ASSIGNING OF NETWORK ADDRESSES TO FANS IN A NETWORK

CROSS-REFERENCE TO RELATED APPLICATIONS

This application claims the benefit and priority of DE 10 2015 113 489.6, filed Aug. 14, 2015. The entire disclosure of the above application is incorporated herein by reference.

FIELD

The present invention concerns a method for assigning of network addresses to fans in a network, as well as a method for configuring such a network.

Moreover, the invention concerns a fan which is designed to receive a distinct network address different from its condition on delivery according to the method of the invention for assigning of network addresses.

BACKGROUND

When making use of a plurality of fans, for example to ventilate buildings or clean room laboratories, the need arises to monitor and control the fans centrally from a central computer. For this, the fans are hooked up as slave units into a network and can communicate with the central computer, e.g., via a bus protocol.

In order to efficiently address the individual fans in the network, however, each fan must be assigned a distinct address in the network.

In the field of application of clean room facilities, radial fans are mostly used, being integrated in so-called Filter Fan Units (FFU) in order to achieve a predetermined are quality class. For this, an air flow is typically created from the ceiling to the floor and is supposed to carry along all unwanted particles contained therein so as to create a particular clean room climate in this way. But such a clean room climate usually cannot be realized by means of a single FFU. Instead, a plurality of fans is operated at different points in the building in order to achieve the needed air quality class.

For this, sometimes hundreds to thousands of fans are controlled by a central computer as slave units. In order for this control and oversight function to be properly carried out by the operating software, the precise location of each fan in the building and its distinct device address on the bus must be known.

It is known that bus-capable slave units in the traditional bus protocols require a distinct slave address, one which differs from each other.

However, one drawback is the situation when, for manufacturing reasons, the identical device address is constantly assigned, which the fan then has in its condition upon delivery.

For this instance, it is known in the prior art how to switch on the fans manually in sequence, while each newly activated fan is assigned a distinct address, differing from the preceding addresses, before the next fan can be switched on. This process is repeated until all fans associated in the network are individually addressable. It is an unsatisfactory circumstance that a large manual effort and a predetermined installation sequence are needed before all fans can be individually addressed by a central control unit through the network.

It has therefore been attempted in the prior art to simplify the addressing procedure. From patent EP 485 878 B1, for example, a bus system is known in which slave units which are parallel branched across T-switches are hooked up in a master-slave bus, each one being assigned its own serial number so that it can be recognized by the master in an initialization phase by means of this serial number. This is done by the master in that it identifies the entire serial number of the respective slave units. Once the identification has been done, the master then assigns to the respective slave a communication address. The drawback to this solution is that the entire serial number has to be determined for the assigning of the communication address, which means a substantial labor during the initialization.

In patent application DE 10 240 832 A1 a bus is proposed which is distinguished in that it is operated in the master-slave mode and the addressing of the connected slaves is likewise done by means of the serial numbers of the individual slaves. In particular, the addressing is carried out in that only a partial feature of the serial number is polled by the master from the individual slaves. Only if a single slave responds to the polling of the master does this slave receive an address. But if several slaves or no slave responds, the polling for the partial feature is refined.

Another method is known from DE 10 2004 039 447 A1 for the automatic assigning of addresses to participants in a system by a master, wherein each participant has an adjustable address storage and is ready to receive via a predetermined channel and wherein each participant selects a random address at the start of the procedure. The master then checks for the entire valid address space whether two subscribers have by chance selected the same random address and in that event it orders the respective participants to select a new random address, wherein the previous distinct addresses already determined for the subscribers are ruled out as possible new random addresses.

This method has the drawback that the address space can be very large, especially with large networks having many subscribers, and this method takes a relatively long time until the master has polled the entire address space and each subscriber possesses a valid individual address.

From EP 2503763 A1 there is known a method for the assigning of network addresses to fans in a network. For this, each fan must have a distinct and distinguishing serial number (or device number) in a serial number storage as well as a network address in an adjustable network address storage. A control unit automatically assigns network addresses to the fans. In the beginning, an identical starting address is assigned to all fans as the network address and serial number queries with a serial number mask are sent out to the starting address. The serial number mask consists of determined and undetermined places, and the fans respond to the serial number mask depending on their serial number. The control unit depending on the responses assigns distinct network addresses to the fans and/or modifies the serial number mask for further serial number queries The drawback to this method is, on the one hand, the expense of the learning of the addresses by the central computer, as well as the problem that even after distinct allocation of a communication address to a fan with the corresponding device number it is not clear where the fan is located in the network, i.e., locally in the building.

One problem here is that the central computer needs to learn all serial numbers of the fans present on the bus and the auto-addressing method formerly used for this is not suitable on account of the possibly chaotic sequence in which the fans are recognized. There is the risk of a recognition of the serial numbers not serially following the bus wiring. The issue is even more acute in the case of a correspondingly large number of fans.

Therefore, the problem which the present invention proposes to solve is to overcome the mentioned drawbacks and provide a method for the setting up and a method for the assigning of network addresses to fans which makes it possible to undertake the network addressing of the fans in large networks with many subscribers in as easy and individual a manner as possible and which makes it possible to determine the position of each fan.

SUMMARY

The basic notion of the invention is that each fan is configured with an external EEPROM with a RFID interface, wherein the EEPROM memory serves as a parameter storage. The EEPROM memory (EEPROM for short) is outfitted for this on the one hand with a serial interface for the wired communication with the microcontroller of the slave unit and also with the aforementioned RFID interface for the wireless communication with a suitable communications unit.

According to the invention, therefore, the method is organized such that each slave can be read out and written into even in the nonoperational, i.e., voltage-free condition, for example by using a RFID communication software on the aforementioned communications unit.

The method according to the invention for setting up the network by means of RFID accordingly calls for the individual FFUs to be installed each at their installation site and then the serial numbers are read out each time by means of a preferably mobile communications unit from the EEPROM of the fan installed in the FFU and at the same time the EEPROM is described with geometrical position parameters in order to determine the installation position of the fan.

The position parameters can be detected preferably in the form of coordinates data. Thus, e.g., X, Y coordinates can be written into the EEPROM for the location in a floor of the building and possibly a Z coordinate, where the Z coordinate characterizes the different floors in the building with the bus network. If need be, even further data characterizing the location can be read in, such as a 4th coordinate for the particular building out of several buildings in which the common network is being constructed.

A first aspect of the present invention therefore concerns a network consisting of at least one central computer and a plurality of FFUs or fans, which are can communicate with or are connected across a common bus system preferably wired and/or wirelessly to the central computer. The fans thus represent slave units in the network, where each fan has a rewritable memory and a RFID interface for communication with a preferably mobile communications device and where the serial number S of the respective fan is saved in the memory and the serial number S can be read out in the nonoperational, i.e., voltage-free state of the respective fan by the communications device.

In one advantageous embodiment of the invention, corresponding position data (such as X, Y, Z coordinate data) on the physical installation position of the particular fan is furthermore saved in the memory of the particular fan.

It is especially advantageous to use an EEPROM with RFID interface as the internal or external memory of each FFU or each fan. The parameter memory of the slave units is preferably realized as an external EEPROM. This affords both a serial interface to the microcontroller of the slave unit and a wireless RFID interface for direct communication with a suitable communications unit, such as a conventional smartphone.

In addition to the R5485 interface which is available and used by the central computer, the slave or the particular fan can also be read out and written into in the voltage-free state directly by means of RFID communication protocols.

It is furthermore preferable to provide the communications device as a mobile communications device, on which software is configured for reading out and writing data into the particular memory of the fan via the respective RFID interface of the fan.

In one advantageous embodiment of the invention, moreover, a position detection device is integrated in or provided in direct proximity to the communications device, having means of detecting the position of the communications device at a time when the serial number of a fan situated closest to the communications device has been read out, in order to relay the detected position in the form of position data directly or indirectly to the memory. For this, the position detection device can have, e.g., a GPS receiver module or a transceiver for communication with beacons, preferably with Bluetooth beacons.

Again preferably, therefore, a plurality of beacons, preferably Bluetooth beacons, are arranged in proximity to the installation positions of the fans distributed within the building and the software of the communications device is configured so that it can identify each beacon in its transmission range and detect its signal strength or signal propagation time. For example, if several beacons are placed in range in a room, the distance to the particular beacon can be ascertained by measuring the signal propagation times. If the position of the beacons within the room is known, the actual position can be ascertained with sufficient accuracy by determining the relative position to one of several such beacons. Since GPS and the other location systems sometimes do not work with sufficient reliability or accuracy within a building, the use of beacons in such a case would be the preferred option. The position data would be determined at the moment when the communication with the RFID-EEPROM of the fan takes place.

Another aspect of the present invention concerns the configuration of the network addresses for the identification of the slave units, i.e., the fans in the network. According to the invention, therefore, a method is proposed for the configuration of a network, preferably one as described above, wherein after the installation of a fan the serial number of the particular fan is read out from its memory by means of the mobile communications device via the RFID interface. Again, preferably, after the reading out of the serial number of the particular fan, a distinct network address is assigned to the fan by means of the mobile communications device.

In another preferred embodiment of the method according to the invention it is provided that a position detection device is integrated in or in direct proximity to said communications device and the method is carried out so that the position of the communications device is detected each time at the moment when the serial number of the fan situated closest to the communications device has been read out and wherein the communications device relays the position as detected by the position detection device in the form of position data directly or indirectly to a memory or writes it directly or indirectly into the memory.

Thus, the installation of the fans can basically occur in any desired sequence. After the installation of a fan at its installation site, the installer can hold the mobile communications device in the immediate proximity of the fan and start the communications software in order to read out data via the RFID interface and relay position data to the memory. Thus, without any involvement by the central memory, already in the voltage-free state of the unit, the data memory can be configured with position data in order to undertake a simple and rapid addressing in the network. Advantageous in this case is an addressing as soon as the network is actively switched on.

After all fans have been installed and supplied with voltage, the central control unit can learn the serial numbers of all fans by an auto-addressing method using RS485 communication. After learning all serial numbers, communication is possible with each of the fans via the bus line. It is now possible to read out the position coordinates of each fan at the central computer and thus visualize the fans in the representation on a display, especially preferably one which shows all fans according to their position data on a scale-model building plan.

In an alternative embodiment according to the invention it can also be provided that the position data for each fan is read in (e.g., through a barcode) or manually entered by means of an interface on the communications device and after the reading out of the serial number of the respective fan the position data which has been read in or entered is assigned to the fan by means of the mobile communications device. For this, the communications device for the data transfer should be located in the sending or receiving range of the respective fan (preferably immediately next to it).

Another aspect of the invention concerns the assigning of network addresses to fans. For this, according to the invention, a control unit, preferably the control unit of the central computer, automatically assigns network addresses (ID) to the fans in that the fans respond with their distinct position data depending on queries from the central computer, e.g., through a broadcast command, and the control unit depending on the responses assigns a distinct network address (ID) to the fans and links this to the position data of the respective fan.

Other advantageous modifications of the invention are characterized in the subclaims or shall be presented more closely below, together with the description of the preferred embodiment of the invention with the help of the figures.

DRAWINGS

FIG. 1, a schematic representation of one embodiment of a network during the configuration according to the invention.

DESCRIPTION

In the following, the invention shall be described more closely with the help of a sample embodiment making reference to FIG. 1, where the same reference numbers refer to identical functional and/or structural features.

FIG. 1 shows a schematic representation of one embodiment of a network 10 according to the invention in a building 100.

The network 10 consisting in this embodiment of a central computer 20 with a central control unit 21 as well as a plurality of fans 30 (on which only four are shown), which have been installed at distributed positions in the building 100. The fans 30 each have individual different serial numbers S (or device numbers) and a standard network address, representing the same factory-assigned network address for all fans 30.

The fans 30 are connected via a bus system 11 across bus lines to the central computer 20 for communication.

The fans 30 installed in the network 10 have a rewritable EEPROM memory 31 with a RFID interface 32 for communication with the depicted mobile communications device 33, which is carried for example by an installer.

The serial numbers S of the four depicted fans 30 have been read out by the communications device 33 already in the nonoperational voltage-free condition of the respective fan 30 and at the same time the position data X, Y, Z detected with the position detection device 40 has been relayed by the communications device 33 via the RFID interface 32 to the EEPROM memory 31.

The position data X, Y, Z saved in the EEPROM memory 31 can be polled afterwards by the control unit 21 of the central computer 20 for identification recognition and then the individual network addresses ID can be relayed across the bus line 11 to the respective fans 30 with an auto-addressing method.

In the present sample embodiment, the communications device 33 is a smartphone with a software application and a GPS module, as well as a Bluetooth transceiver for the receiving of transmission signals from Bluetooth beacons 50, which are arranged in the building 100 and distributed in the surroundings of the installation positions of the fans 30.

The software application on the smartphone 33 is configured such that it is possible to identify those beacons 50 in the transmission range of the communications device with the integrated Bluetooth transceiver and detect their signal strength or signal propagation time. From this, by conventional methods (e.g., triangulation), it is possible to determine the geometrical position data of the communications device 33. For this, the communications device 33 is located, as indicated schematically in FIG. 1, in immediate proximity to each fan 30 whose installation position is being determined, so that the position of the communications device 33 corresponds with sufficient accuracy to the position of the fan 30.

Alternatively, one could likewise ascertain the position data X, Y, Z with a GPS receiver module given adequate signal strength and relay it via the RFID interface 32 to the EEPROM memory 31 for storage there.

The invention is not limited in its embodiment to the above indicated sample embodiments. Instead, a number of variants are conceivable, which make use of the represented solution even in fundamentally different kinds of configuration.

The invention claimed is:

1. A network comprising:
   at least one central computer, and
   a plurality of fans which can be in a voltage-free nonoperational state or in an operational state supplied with voltage, wherein the plurality of fans communicate in a wired and/or a wireless manner via a bus system with the central computer,
   each of the plurality of fans has a rewritable memory and a RFID interface for communication with a mobile communications device, a serial number of a respective fan is stored in its memory,
   the serial number can be read out in a voltage-free nonoperational state of the respective fan by the mobile communications device,
   the central computer is configured such that it can automatically assign network addresses to voltage-free fans of the plurality of fans depending on the serial number read out, a position detection device is integrated in or provided in direct proximity to the mobile communications device, the position detection device detects position of the mobile communications device when the communication device is closest to a desired fan of the plurality of fans so that at a moment when the serial number of the desired fan situated closest to the communications device has been read out, in order to relay the detected position in the form of position data directly or indirectly to the memory, the positioning data being in the form of coordinate data for locating a particular floor of a particular building of several buildings; and a plurality of beacons preferably Bluetooth beacons are provided, and are distributed in surroundings of installation positions of the fans, and software of the communications device is configured to identify each beacon in its transmission range and detect its signal strength or signal propagation time to determine a distance to a particular beacon which, in turn, enables ascertaining the desired fan position by determining relative position to one of the plurality of beacons.

2. The network according to claim 1, wherein corresponding position data for the local installation position of the particular fan is saved in the memory of the particular fan.

3. The network according to claim 1, wherein the memory is an EEPROM with a RFID interface.

4. The network according to claim 1, wherein the communications device is a mobile communications device on which software is provided for reading out and writing in data in the respective memory of the fan via the respective RFID interface of the fan.

5. The network according to claim 4, wherein the position detection device has a GPS receiver module.

6. A method for the configuration of the network according to claim 1, wherein after installation of the respective fan the serial number of the respective fan is read out from its memory by means of the mobile communications device.

7. The method according to claim 6, wherein after reading out the serial number of the particular fan a distinct network address is assigned to the fan by means of the mobile communications device.

8. The method according to claim 6, wherein a position detection device is integrated in or provided in immediate proximity to the communications device, which detects the position of the communications device at the moment when the serial number of the closest fan to the communications device is read out and wherein the communications device relays the position detected by the position detection device in the form of position data directly or indirectly to a memory or writes it directly or indirectly into the memory.

9. The method according to claim 6, wherein position data for each fan is entered by means of an interface on the communications device or entered manually and after the serial number of the respective fan is read out its position data is assigned to the fan by means of the mobile communications device.

10. A method for assigning of network addresses to fans hooked up in the voltage-free state in the network according to claim 1, wherein a control unit automatically assigns network addresses to the fans in that the fans respond depending on their distinct position data and the network addresses are assigned depending on this and linked to position data of the respective fan.

11. The method according to claim 10, wherein the control unit is a control unit of the central computer.

12. A fan configured for use in the network according to claim 1, wherein the fan is outfitted with a rewritable and readable memory with a RFID interface.

13. A fan configured for use in the network according to claim 6, wherein the fan is outfitted with a rewritable and readable memory with a RFID interface.

* * * * *